United States Patent
Xie

(10) Patent No.: US 6,942,939 B2
(45) Date of Patent: Sep. 13, 2005

(54) SYSTEM AND METHOD FOR CONTROLLING METHANOL CONCENTRATION IN A FUEL CELL

(75) Inventor: Chenggang Xie, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 262 days.

(21) Appl. No.: 10/323,036

(22) Filed: Dec. 18, 2002

(65) Prior Publication Data

US 2004/0121198 A1 Jun. 24, 2004

(51) Int. Cl.[7] .............................................. H01M 8/04
(52) U.S. Cl. ....................................................... 429/22
(58) Field of Search ................................. 429/13, 22

(56) References Cited

U.S. PATENT DOCUMENTS

| | | | |
|---|---|---|---|
| 3,819,305 A | 6/1974 | Klochemann et al. | ... 417/413.1 |
| 3,830,403 A | 8/1974 | Castan et al. | ................. 222/57 |
| 3,915,747 A | 10/1975 | Summers et al. | ............. 429/17 |
| 5,766,786 A | 6/1998 | Fleck et al. | .................... 429/17 |

FOREIGN PATENT DOCUMENTS

| | | |
|---|---|---|
| EP | 1258153 | 12/1971 |
| JP | 62010872 | 1/1987 |
| WO | WO 02/49132 A2 | 6/2002 |

*Primary Examiner*—Patrick Joseph Ryan
*Assistant Examiner*—Thomas H. Parsons

(57) ABSTRACT

A system and method for controlling or otherwise effectively parameterizing the delivery of fuel to a fuel cell device comprises a fuel pump (330), a mixing chamber (310), a fuel concentration sensor (350), a control device (360), a pump driver (370) and a pulse generator (380). Various features and parameters of the present invention may be suitably adapted to optimize the fuel transport function for any particular fuel cell design. The present invention provides inter alia improved control of delivery of methanol to a DMFC fuel solution.

2 Claims, 2 Drawing Sheets

US 6,942,939 B2

SYSTEM AND METHOD FOR CONTROLLING METHANOL CONCENTRATION IN A FUEL CELL

FIELD OF INVENTION

The present invention generally concerns fuel cell technology. More particularly, the present invention involves a system and method for controlling the introduction and/or concentration of methanol in the operation of fuel cell device.

BACKGROUND OF THE INVENTION

Fuel cells are electrochemical cells in which a free energy change resulting from a fuel oxidation is converted into electrical energy. The earliest fuel cells were first constructed by William Grove in 1829 with later development efforts resuming in the late 1930's with the work of F. T. Bacon. In early experiments, hydrogen and oxygen gas were bubbled into compartments containing water that were connected by a barrier through which an aqueous electrolyte was permitted to pass. When composite graphite/platinum electrodes were submerged into each compartment and the electrodes were conductively coupled, a complete circuit was formed and redox reactions took place in the cell: hydrogen gas was oxidized to form protons at the anode (e.g., "hydrogen electrode") and electrons were liberated to flow to the cathode (e.g., "oxygen electrode") where they subsequently combined with oxygen.

Since that time, interest in the development of viable commercial and consumer-level fuel cell technology has been renewed. In addition to various other benefits compared with existing conventional methods, fuel cells generally promise improved power production with higher energy densities. For example, a typical hydrogen-oxygen cell operating at about 250° C. and a pressure of about 50 atmospheres yields approximately 1 volt of electric potential with the generation of water and a small quantity of thermal energy as byproducts. More recently, however, modern Polymer Electrolyte Membrane Fuel Cells (PEMFC's) operating at much lower temperatures and pressures (i.e., on the order of about 80° C. and about 1.3 atmospheres) have been observed to produce nearly the same voltage potential.

An additional advantage of fuel cells is that they generally have a higher energy density and are intrinsically more efficient than methods involving indirect energy conversion. In fact, fuel cell efficiencies have been typically measured at nearly twice those of thermo-electric conversion methods (i.e., fossil fuel combustion heat exchange).

With respect to portable power supply applications, fuel cells function under different principles as compared with standard batteries. As a standard battery operates, various chemical components of the electrodes are depleted over time. In a fuel cell, however, as long as fuel and oxidant are continuously supplied, the cell's electrode material is not consumed and therefore will not run down or require recharging or replacement.

One class of fuel cells currently under development for general consumer use are hydrogen fuel cells, wherein hydrogen-rich compounds are used to fuel the redox reaction. As chemical fuel species are oxidized at the anode, electrons are liberated to flow through the external circuit. The remaining positively-charged ions (i.e., protons) then move through the electrolyte toward the cathode where they are subsequently reduced. The free electrons combine with, for example, protons and oxygen to produce water —a environmentally clean byproduct. However, as the redox reaction proceeds in a Direct Methanol Fuel Cell (DMFC), the build-up of byproduct carbon dioxide may limit the ability of the device to produce additional electrical power.

Prior art fuel cells have typically employed methods to deliver fluid fuels that generally involve substantially continuous pumping in response to a control signal without adjustment for temporal variations in control sensor response. While these approaches may be acceptable in certain systems, the broader application of fuel cell technology, for example to portable consumer-level devices, presents previously unresolved problems with respect to the delivery of fluid fuels. Accordingly, a representative limitation of the prior art concerns the effective and efficient delivery of, for example, methanol during the operation of a DMFC device.

SUMMARY OF THE INVENTION

In various representative aspects, the present invention provides inter alia a system and method for controlling, or otherwise effectively parameterizing, the transport function of fuels in the operation of a fuel cell device. In one exemplary aspect, the present invention provides a system comprising a fuel pump, a mixing chamber, a fuel concentration sensor, a control device, a pump driver and a pulse generator. A representative advantage of the present invention includes the user- or designer-controlled delivery of fuel during operation of a fuel cell device. Another exemplary advantage includes the reduction of fuel concentration variation in DMFC applications by at least two orders of magnitude.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Figure 1:
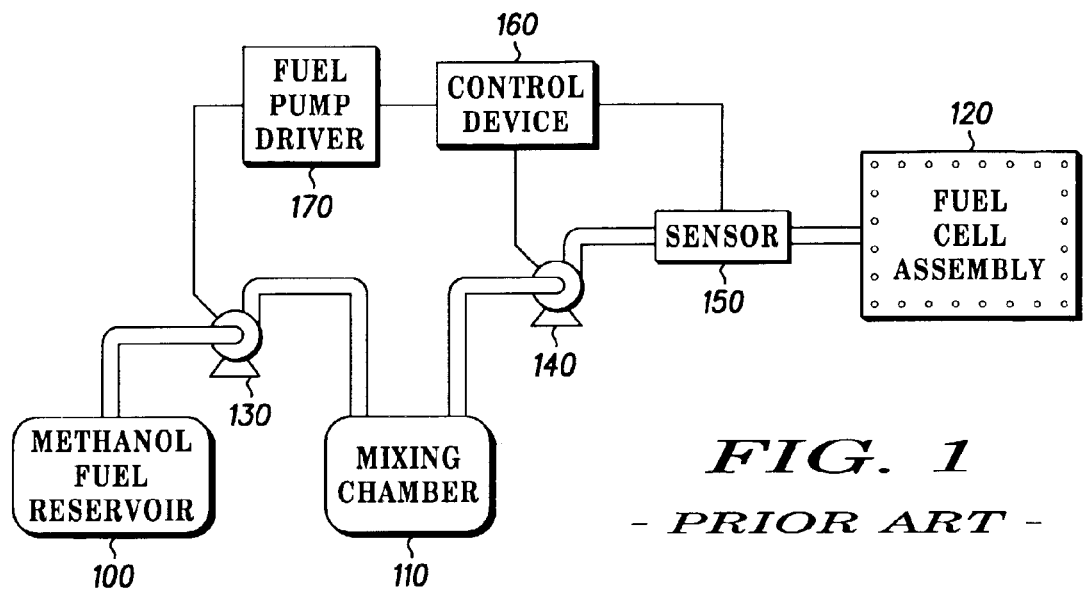
FIG. 1 illustrates a schematic of a representative fuel cell fuel delivery system as practiced in the prior art.
Figure 2:
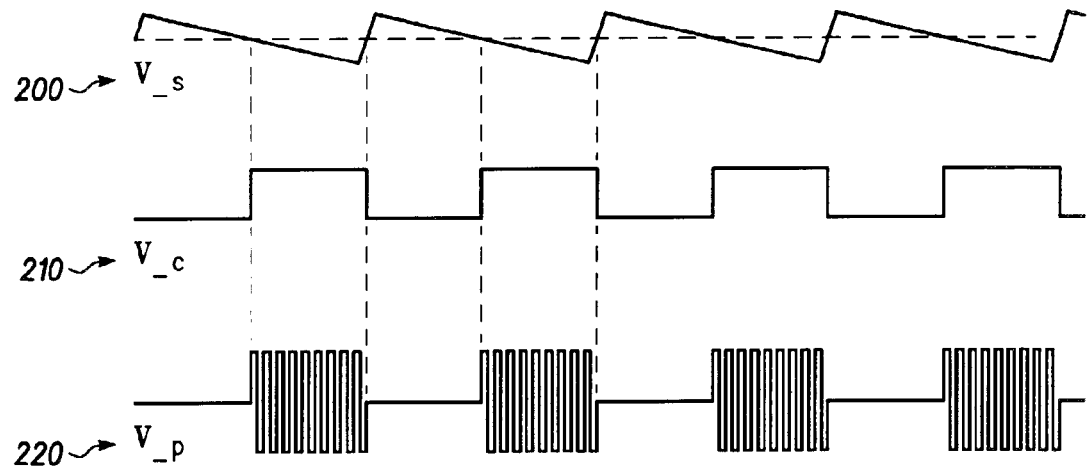
FIG. 2 illustrates a timing chart corresponding to the prior art system generally depicted in FIG. 1.

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms 'first', 'second', and the like herein, if any, are used inter alia for distinguishing between similar elements and not necessarily for describing a sequential or chronological order. Moreover, the terms front, back, top, bottom, over, under, along and the like in the Description and/or in the claims, if any, are generally employed for descriptive purposes and not necessarily for comprehensively describing exclusive relative position. Skilled artisans will therefore understand that any of the preceding terms so used may be interchanged under appropriate circumstances such that various embodiments of the invention described herein, for example, are capable of operation in other orientations than those explicitly illustrated or otherwise described.

DETAILED DESCRIPTION OF EXEMPLARY EMBODIMENTS

The following descriptions are of exemplary embodiments of the invention and the inventor's conception of the best mode and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for controlling or otherwise parameterizing the transport and/or distribution of fuels in a fuel cell system. Certain representative implementations may include, for example: controlling the concentration of fuel in a fuel cell solution; controlling the concentration of gaseous phase chemical species in a fuel cell solution; or controlling the rate of elimination of exhaust gases from a fuel cell. As used herein, the terms "delivery" and "transport", or any variation or combination thereof, are generally intended to include anything that may be regarded as at least being susceptible to characterization as or generally referring to the movement of at least one chemical compound from one area to another area so as to: (1) relatively decrease the concentration in or around one area, and/or (2) relatively increase the concentration in or around another area. The same shall properly be regarded as within the scope and ambit of the present invention. As used herein, the terms "fuel", "fluid" and "solution", or any variation or combination thereof, are generally intended to include any anode fuel solution and/or cathode oxidant solution whether or not the solution has been pre-conditioned or post-conditioned with respect to exposure to a fuel cell's electrode elements.

A detailed description of an exemplary application, namely the parameterization and control of the rate of delivery of methanol in a DMFC anode fuel stream, is provided as a specific enabling disclosure that may be generalized by skilled artisans to any application of the disclosed system and method for controlling fuel transport in any type of fuel cell in accordance with various embodiments of the present invention. Moreover, skilled artisans will appreciate that the principles of the present invention may be employed to ascertain and/or realize any number of other benefits associated with controlling the transport of fuel in a fuel cell such as, but not limited to: reclamation of gaseous byproducts; reformation of at least one constituent fuel compound; controlling the concentration of dissolved gaseous byproducts in a fuel system; controlling a fuel cell's redox reaction kinetics and the like.

Fuel Cells

In the broadest sense, a fuel cell may be generally characterized as any device capable of converting the chemical energy of a supplied fuel directly into electrical energy by electrochemical reactions. This energy conversion corresponds to a free energy change resulting from the oxidation of a supplied fuel. A typical prior art fuel cell consists of an anode (e.g., 'fuel electrode') that provides a reaction site to generate electrons and a cathode (e.g., 'oxidant electrode') to reduce spent fuel ions in order to produce a voltage drop across the external circuit. The electrodes are generally tonically porous electronic conductors that include catalytic properties to provide significant redox reaction rates. At the anode, incident hydrogen gas catalytically ionizes to produce protons (e.g., electron-deficient hydrogen nuclei) and electrons. At the cathode, incident oxygen gas catalytically reacts with protons migrating through the electrolyte and incoming electrons from the external circuit to produce water as a byproduct. Depending on various operational parameters of the fuel cell, byproduct water may remain in the electrolyte, thereby increasing the volume and diluting the electrolyte, or may be discharged from the cathode as vapor.

The anode and cathode are generally separated by an ion-conducting electrolytic medium (i.e., PEM's or alkali metal hydroxides such as, for example: KOH, NaOH and the like). In early fuel cell experiments, hydrogen and oxygen were introduced into compartments and respectively while the electrodes, were conductively coupled by an external circuit to power a load where electrical work could be accomplished. In the external circuit, electric current is generally transported by the flow of electrons, whereas in the electrolyte current is generally transported by the flow of ions. In theory, any chemical substance capable of oxidation (i.e., hydrogen, methanol, ammonia, hydrazine, simple hydrocarbons, and the like) which may be supplied substantially continuously may be used as galvanically oxidizable fuel at the anode. Similarly, the oxidant (ie., oxygen, ambient air, etc.) may be selected to be any substance that can oxidize spent fuel ions at a sufficient rate to maintain a suitable voltage drop across the external circuit.

Thermodynamics

The free energy of reaction $\Delta G$ of a fuel cell is given as $\Delta G = \Delta E + \Delta H$, where $\Delta E$ is the energy available to accomplish electrical work and $\Delta H$ is the energy liberated from the reaction to raise the temperature of the fuel cell and the surroundings. In typical fuel cell applications, the heat liberated to the fuel cell's surroundings is much less than the energy available to accomplish electrical work; which may be expressed as: $\Delta H \ll \Delta E$.

For example, where $$Q_{FuelCell} = \frac{E_{Electrical}}{E_{Chemical}}$$

represents the efficiency of converting chemical potential energy $E_{Chemical}$ directly to electrical energy $E_{Electrical}$, typical hydrogen/oxygen fuel cell efficiencies on the order of $Q_{FuelCell}=0.65$ to about $Q_{FuelCell}=0.80$ have been observed. These values are nearly twice those of indirect heat-exchange power conversion methods, which may be expressed by the following relation:

$$Q_{FuelCell} \approx 2 Q_{HeatExchange}$$

where the heat-exchange efficiency is given as $$Q_{HeatExchange} = \frac{E_{Combustion}}{E_{Chemical}} \times \frac{E_{Electrical}}{E_{Combustion}}$$

The factor $$\frac{E_{Combustion}}{E_{Chemical}}$$

represents the component efficiency of converting chemical potential energy into heat (i.e., the combustion of fossil fuels) and the factor $$\frac{E_{Electrical}}{E_{Combustion}}$$

represents the component efficiency of converting heat into electrical energy; for example, steam-driven turbo-electric power.

Accordingly, fuel cell operation is intrinsically more efficient than methods employing heat-exchange power conversion. Moreover, other representative benefits of fuel cells include higher energy densities, quiet operation and the lack of recharging and/or electrode replacement requirements.

Portable Power Supplies

Standard batteries have generally dominated the available choices for portable power storage solutions for consumer-level electronic equipment in the past. Some of the disadvantages associated with standard batteries, however, is that they generally provide power for a relatively short duration of time and thereafter require recharging or replacement. Fuel cells, on the other hand, have many of the consumer-oriented features typically associated with standard batteries (i.e., providing quiet power in a convenient and portable package) in addition to other representative advantages including, for example, long usage lifetimes and the ability to be fueled with liquid or gaseous compounds rather than 'solid fuels' as used in conventional batteries.

While the size of fuel cells has decreased and their energy densities have increased over time, there have been various problems in the prior art with adaptation of fuel cell technology to applications for delivering power, for example, to portable electronic devices. At least one such problem involves the processing and/or venting of exhaust gases in a fuel cell solution stream. Typical approaches that have been employed have generally involved substantially direct, orientation-dependent (e.g., anti-parallel to gravity) venting of redox byproduct gas to the ambient atmosphere; however, direct venting, gravity-dependent approaches generally do not permit the fuel cell to be operated in any orientation without substantial leakage or otherwise undesirable migration or leakage of fuel components.

Fuel Cell Development

One class of fuel cells currently under development for consumer use is the hydrogen fuel cell, wherein hydrogen-rich fuels (i.e., hydrogen, methanol, methane, etc.) are used to fuel the redox reaction. As fuel is oxidized at the anode, protons pass through the cell for reduction at the cathode. In the case of using methanol as the fuel for example, carbon dioxide is formed as a byproduct at the anode. Free electrons from the external circuit then affect reduction of oxygen at the cathode. The reduced oxygen then combines with protons to produce water.

One process for fueling a hydrogen cell comprises that of 'direct oxidation' methods. Direct oxidation fuel cells generally include fuel cells in which an organic fuel is fed to the anode for oxidation without significant pre-conditioning or modification of the fuel. This is generally not the case with 'indirect oxidation' (e.g., "reformer") fuel cells, wherein the organic fuel is generally catalytically reformed or processed into organic-free hydrogen for subsequent oxidation. Since direct oxidation fuel cells do not generally require fuel processing, direct oxidation provides substantial size and weight advantages over indirect oxidation methods. Exemplary prior art direct and indirect fuel cells have been previously disclosed and may be compared, for example, in U.S. Pat. Nos. 3,013,908; 3,113,049; 4,262,063; 4,407,905; 4,390,603; 4,612,261; 4,478,917; 4,537,840; 4,562,123; 4,629,664 and 5,599,638.

Another well-known type of fuel cell component is known as a 'membrane-electrode assembly' (MEA), as described for example in U.S. Pat. No. 5,272,017 issuing on Dec. 21, 1993 to Swathirajan. One exemplary embodiment of such an MEA component includes a DMFC which comprises a thin, proton-transmissive, solid polymer-membrane electrolyte having an anode on one of its faces and a cathode on an opposing face. The DMFC MEA anode, electrolyte and cathode may also be sandwiched between a pair of electrically conductive elements which serve as current collectors for the anode and cathode respectively and contain appropriate channels and/or openings for generally distributing the fuel (i.e., methanol and water, in the case of a DMFC device) and oxidant reactants (i.e., oxygen) over the surfaces of the corresponding electrode catalyst. In practice, a number of these unit fuel cells may be stacked or grouped together to form a 'fuel cell stack'. The individual cells may be electrically connected in series by abutting the anode current collector of one cell with the cathode current collector of a neighboring unit cell in the stack.

As the DMFC anode is fueled with a mixture of methanol and water, the oxidation reaction generally proceeds in three steps: (1) methanol oxidizes to methanal (e.g., formaldehyde), releasing two electrons; (2) methanal oxidizes to methanoic acid (e.g., formic acid), releasing two electrons; and (3) methanoic acid oxidizes to carbon dioxide, releasing another two electrons. In various embodiments of exemplary DMFC's, the oxidation reaction may be started at any point in the multi-step series since the two intermediates (methanal and methanoic acid) are generally readily obtainable. It is generally believed, however, that the first oxidative step (methanol to methanal) is the rate-determining step of the overall reaction given spectroscopic studies indicating that methanal and methanoic acid appear in relatively low concentrations. This would generally suggest that the intermediates are rapidly oxidized and accordingly, the reaction steps corresponding to their oxidative consumption would be expected to have larger kinetic rate constants. The net anode reaction for a direct methanol-fueled device is therefore generally given as:

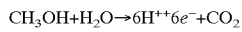

$CH_3OH + H_2O \rightarrow 6H^+ + 6e^- + CO_2$

Typically, the current produced by a DMFC is proportional to the net reaction rate, wherein one ampere corresponds approximately to 1.04E18 reactions per second. As aqueous methanol is oxidized at the anode, electrons are liberated to flow through an external circuit to power a load where electrical work may be accomplished. Protons migrate through the proton-transmissive electrolytic membrane where they subsequently are combined with oxygen that has been reduced with incoming electrons from the external circuit with water formed as a result.

Prior art DMFC's have generally employed methods of exhausting water at the cathode and carbon dioxide at the anode that generally involve substantially direct gravity-dependent venting to the atmosphere or retention within the fuel cell itself. Accordingly, one representative advantage of various embodiments of the present invention includes the ability to effectively vent and/or control the concentration of byproduct gases in a redox fuel system in substantially any orientation of the device with respect to gravity. In one representative and enabling aspect, the present invention may be practiced, for example, to control the elimination of $CO_2$ from the anode fuel stream in a DMFC device; however, the present invention may be alternatively practiced, extended or otherwise modified to partition or otherwise separate any byproduct gas in the anode fuel solution, the cathode oxidant solution and/or any other pre- or post-conditioned solution (i.e., a waste solution) in a fuel cell device.

Controlling Fuel Transport in a DMFC

FIG. 1 generally depicts a methanol delivery system for a direct methanol fuel cell in accordance with a representative implementation of the prior art. A methanol fuel reservoir 100 feeds mixing chamber 110 via operation of fuel pump 130. Supply pump 140 delivers diluted fuel from mixing chamber 110 to fuel cell assembly 120. Sensor 150 provides fuel concentration information to control device 160. Control device 160 actuates supply pump 140 and provides input to fuel pump driver 170 which in turn actuates fuel pump 130.

When methanol concentration is above a predetermined value, sensor signal $V\_s$ 200 is high. This corresponds to control device signal $V\_c$ 210 registering low and pump driver signal $V\_p$ 220 in the "off" state. As the methanol concentration falls just below the threshold value, sensor signal $V\_s$ 200 registers as low. This corresponds to control device signal $V\_c$ 210 flipping high and pump driver signal $V\_p$ 220 turning "on".

Typical methanol concentrations in DMFCs may be on the order of about 0.5 M to 2.0 M or higher. To increase the energy density of the device, fuel cell systems usually carry a relatively small amount of water stored in mixing chamber 110. Pure methanol is generally added in mixing chamber 110 when methanol concentration is below the preset level. Due to the type of sensor employed to measure methanol concentration and the physical configuration of the system, a delay is generally observed between the equilibration of methanol concentration in mixing chamber 110 and the local methanol concentration observed in the immediate region of sensor 150. As the volume of fuel fluid in mixing chamber 110 decreases over the duration of the delay time, fuel pump 130 may have been actuated to have already delivered more methanol than needed. In some cases, methanol concentration overcharge may result thereby degrading performance of the fuel cell device.

Figure 3:
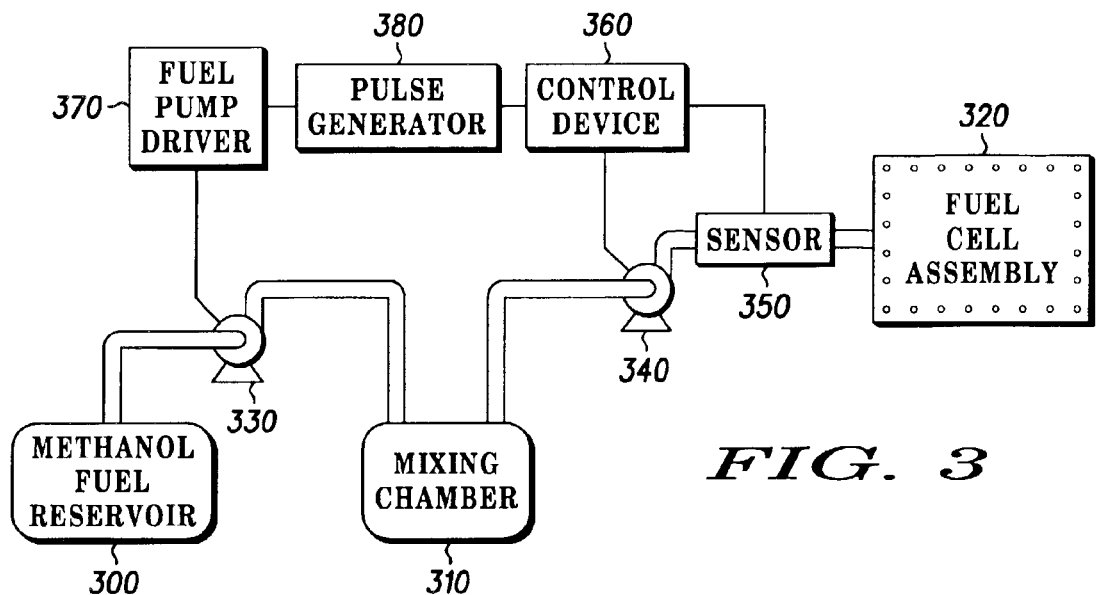
FIG. 3 representatively depicts a schematic of a fuel cell fuel delivery system in accordance with an exemplary embodiment of the present invention.
Figure 4:
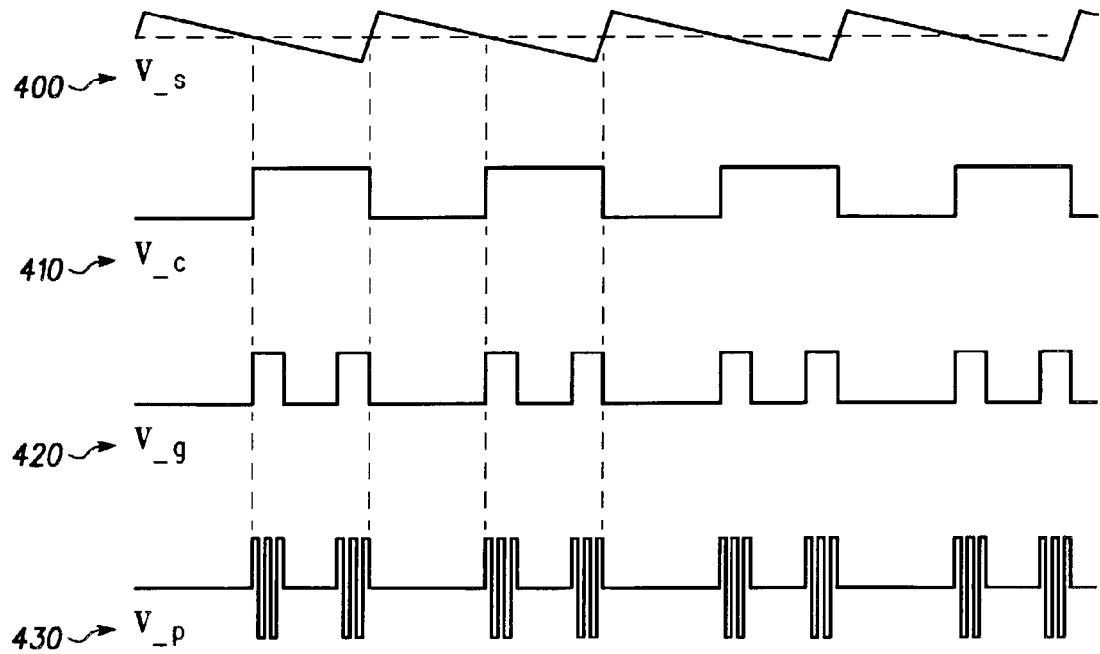
FIG. 4 illustrates a representative timing chart corresponding to the system generally depicted, for example, in FIG. 3.

In an exemplary embodiment in accordance with one representative aspect of the present invention, as generally illustrated for example in FIG. 3, a system for controlling the fuel concentration is a fuel cell comprises a fuel reservoir 300, a fuel pump 330, a mixing chamber 310, a fuel concentration sensor 350, a supply pump 340, a fuel cell assembly 320, a control device 360, a pulse generator 380 and a pump driver 370.

Fuel reservoir 300 feeds mixing chamber 310 via operation of fuel pump 330. Supply pump 340 delivers diluted fuel from mixing chamber 310 to fuel cell assembly 320. Sensor 350 provides fuel concentration information to control device 360. Control device 360 actuates supply pump 340 and provides input to pulse generator 380. Pulse generator 380 provides input to fuel pump driver 370 which in turn actuates fuel pump 330.

When methanol concentration is above a predetermined value, sensor signal $V\_s$ 400 is high. This corresponds to control device signal $V\_c$ 410 registering low and pulse generator signal $V\_g$ 420 and pump driver signal 430 in the "off" state. As the methanol concentration falls just below the threshold value, sensor signal $V\_s$ 400 registers as low. This corresponds to control device signal $V\_c$ 410 flipping high which in turn activates pulse generator 380 to generate a pulse signal $V\_g$ 420 over the duration of control signal $V\_c$ 410. Pump driver signal $V\_p$ turns "on" over the gate duration of the pulse signal $V\_g$ 420 rather than directly from control signal $V\_c$ 410. In accordance with various exemplary embodiments of the present invention, pulse generator 380 effectively pulses fuel injection over the gate duration of control signal $V\_c$ 410 so as to allow equilibration of fuel concentration in the local region of sensor 350 with the fuel concentration of mixing chamber 310.

In an exemplary application in accordance with one embodiment of the present invention, short pulses separated by relatively long waiting periods for subsequent injections resulted in a reduction of concentration variation with respect to time from about 200% down to about 3%. When fuel concentration is below a predetermined level, control circuit 360 sends a signal to prepare fuel delivery pump 330 for fuel injection. Fuel pump 330 starts to add fuel from fuel reservoir 300 into mixing chamber 310 periodically in multiple pulses until fuel pump 330 receives a signal indicating that fuel pump 330 is to be turned "off". The pulse width and duty cycle may be determined, for example, by the power output and/or the energy load placed on the fuel cell device. Accordingly, the disclosed device and method gives the fuel cell system time to mix, for example, pure methanol into diluted fuel thereby avoiding methanol overcharge in a DMFC.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

I claim:

1. A method for controlling the concentration of fuel in a fuel cell, the method comprising:

a. injecting at least one dose of fuel into a mixing chamber for diluting the fuel;
   b. measuring the concentration of the diluted fuel;
   c. generating a series of pulses when the concentration is below a first predetermined value;
   d. injecting a series of doses of fuel into said mixing chamber in response to the series of pulses, each dose corresponding, to one each of the pulses;
   e. measuring the concentration of the diluted fuel;
   f. terminating the series of pulses when the concentration is above a second predetermined value; and
   g. repeating steps c, d, e f, and g.

2. A system for controlling the concentration of methanol in a direct methanol fuel cell, the system comprising:

a first fuel pump in fluid communication with a methanol fuel reserve and a mixing chamber, said first fuel pump suitably adapted to transport methanol from said methanol fuel reserve to said mixing chamber;

a second fuel pump in fluid communication with said mixing chamber and a direct methanol fuel cell assembly, said second fuel pump suitably adapted to transport fluid from said mixing chamber to said direct methanol fuel cell assembly;

a fuel concentration sensor for sensing the concentration of methanol supplied to said direct methanol fuel cell assembly;

a pulse generation;

an electronic control device communicably connected to said pulse generator and said sensor, wherein said electronic control device actuates said pulse generator when the concentration of methanol is below a first predetermined value;

a pump driver communicably connect to said pulse generator, wherein said pump driver is actuated by said pulse generator for time durations equal in duration to each of the pulses from said pulse generator;

said first fuel pump communicably connected to said pump driver, wherein said first pump is actuated by said pump driver to supply fuel to the mixing chamber until the concentration exceeds a second predetermined value.

* * * * *